United States Patent
Tangeland et al.

(10) Patent No.: US 11,336,840 B2
(45) Date of Patent: May 17, 2022

(54) MATCHING FOREGROUND AND VIRTUAL BACKGROUND DURING A VIDEO COMMUNICATION SESSION

(71) Applicant: Cisco Technology, Inc., San Jose, CA (US)

(72) Inventors: Kristian Tangeland, Oslo (NO); Frode Tjøntveit, Fjellhamar (NO); Erik Hellerud, Oslo (NO); Torgeir Moringen, Moss (NO); Mattias Ahnoff, Fornebu (NO)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/010,333

(22) Filed: Sep. 2, 2020

(65) Prior Publication Data
US 2022/0070389 A1   Mar. 3, 2022

(51) Int. Cl.
*H04N 5/272* (2006.01)
*H04N 7/15* (2006.01)
(Continued)

(52) U.S. Cl.
CPC .............. *H04N 5/272* (2013.01); *G06T 3/60* (2013.01); *G06T 5/002* (2013.01); *G06T 5/003* (2013.01); *G06T 5/007* (2013.01); *H04N 5/2353* (2013.01); *H04N 7/15* (2013.01); *G06T 2207/10016* (2013.01); *G06T 2207/10024* (2013.01)

(58) Field of Classification Search
USPC ...................................................... 348/14.07
See application file for complete search history.

(56) References Cited

U.S. PATENT DOCUMENTS 8,212,889 B2   7/2012 Chanas et al.
8,331,715 B2   12/2012 Steinberg et al.
(Continued)

FOREIGN PATENT DOCUMENTS

JP   2013132028 A   7/2013

OTHER PUBLICATIONS

Patterson, Steve, "Matching Colors of Objects Between Photos With Photoshop", https://www.photoshopessentials.com/photo-editing/match-color/, downloaded Sep. 2, 2020, 16 pages.
(Continued)

*Primary Examiner* — Amal S Zenati
(74) *Attorney, Agent, or Firm* — Edell, Shapiro & Finnan, LLC

(57) ABSTRACT

A method, computer system, and computer program product are provided for virtual background replacement during a video communication session. A frame comprising a user image and a captured background is obtained from a video capture device as part of a video stream. The frame is processed to replace the captured background with a virtual background. A change to an exposure characteristic of the video capture device is determined. In response to determining the change to the exposure characteristic, the virtual background is modified to match a virtual background brightness with a user image brightness to produce a modified virtual background. The frame is modified by combining the user image with the modified virtual background.

20 Claims, 9 Drawing Sheets

(51) Int. Cl.
  *H04N 5/235* (2006.01)
  *G06T 3/60* (2006.01)
  *G06T 5/00* (2006.01)

(56) References Cited

U.S. PATENT DOCUMENTS

| | | | |
|---|---|---|---|
| 9,942,481 B2 | 4/2018 | Venshtain et al. | |
| 10,580,040 B2 | 3/2020 | Du | |
| 2018/0115717 A1* | 4/2018 | Kao | H04N 5/3572 |
| 2020/0226729 A1* | 7/2020 | Zhang | G06T 5/50 |

OTHER PUBLICATIONS

Zoom Video Communications, Inc., "Virtual background", https://support.zoom.us/hc/en-us/articles/210707503-Virtual-background#h_bebf36a4-c1e9-4769-9d3c-e0d01457d341, downloaded Sep. 2, 2020, 6 pages.

* cited by examiner

US 11,336,840 B2

MATCHING FOREGROUND AND VIRTUAL BACKGROUND DURING A VIDEO COMMUNICATION SESSION

TECHNICAL FIELD

The present disclosure relates to video processing, and more specifically, to matching a foreground and a virtual background during a video communication session.

BACKGROUND

Many video communication applications enable a user to replace their actual background with a virtual background, which can be provided in real-time during a video communication session to give the appearance that the user is in another environment. For example, a user may enable a virtual background so that the user appears to be outdoors when the user is actually in an office. However, conventional approaches to virtual background replacement typically appear inauthentic due to inconsistencies between the appearance of the user's person and the appearance of the virtual background.

BRIEF DESCRIPTION OF THE DRAWINGS

Generally, like reference numerals in the various figures are utilized to designate like components.

DESCRIPTION OF EXAMPLE EMBODIMENTS

Overview

Figure 1:
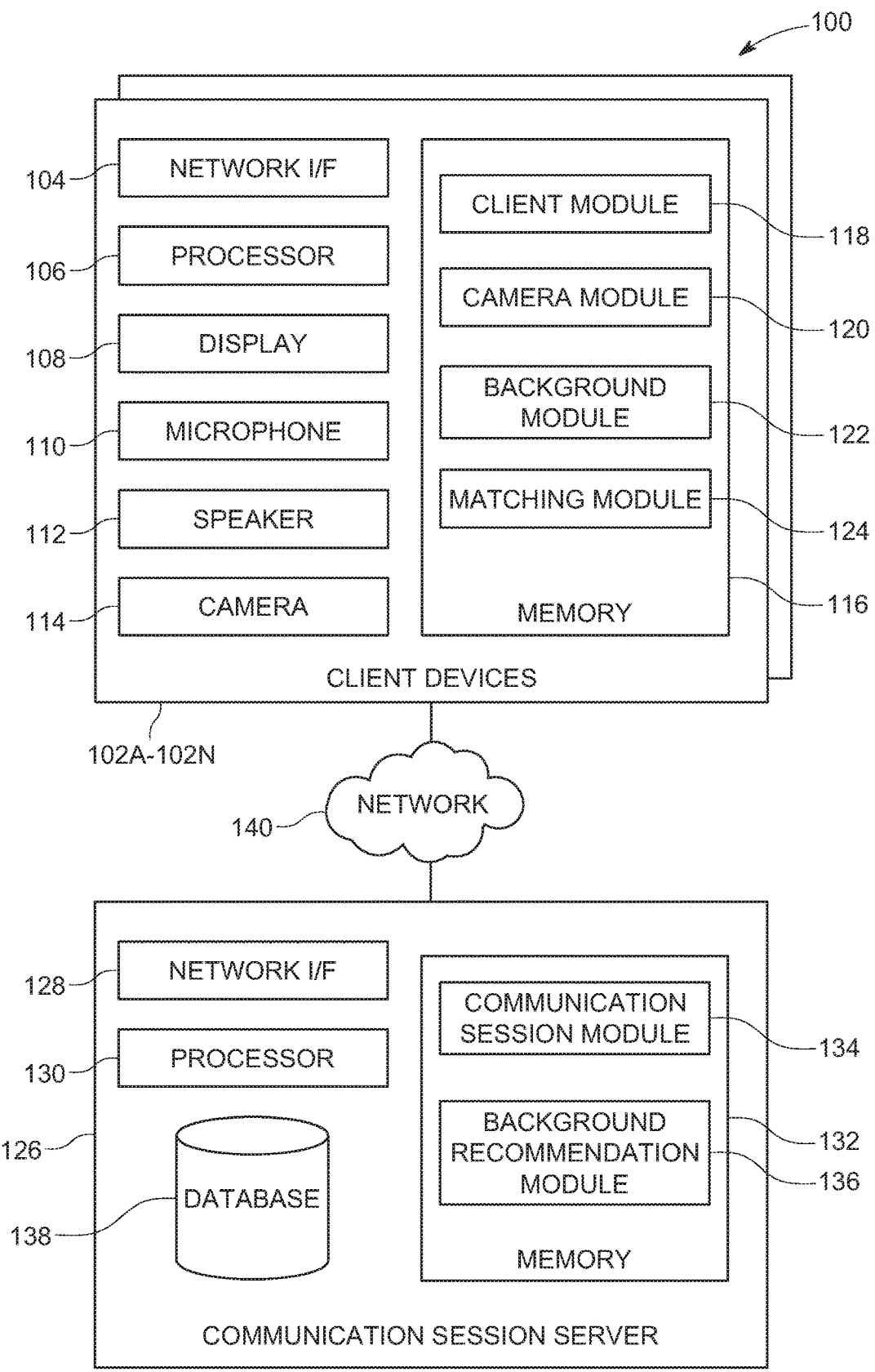
FIG. 1 is a block diagram depicting a system for video processing in accordance with an example embodiment.

According to one embodiment, methods are provided for virtual background replacement during a video communication session. A frame comprising a user image and a captured background is obtained from a video capture device as part of a video stream. The frame is processed to replace the captured background with a virtual background. A change to an exposure characteristic of the video capture device is determined. In response to determining the change to the exposure characteristic, the virtual background is modified to match a virtual background brightness with a user image brightness to produce a modified virtual background. The frame is modified by combining the user image with the modified virtual background.

EXAMPLE EMBODIMENTS

Embodiments are provided for video processing, and more specifically, to matching a foreground and a virtual background during a video communication session.

A video communication session, also known as a teleconference, video conference, web-conference, on-line meeting, etc., is a live conversation between two or more participants in which the participants can communicate by sharing audio and video between each other's endpoint devices. During a video communication session, a user may opt to change the appearance of their actual background to a virtual background. When a video communication session endpoint device provides a virtual background, the user's person or body may be identified to extract the user image from each frame so that the user image can be superimposed over a virtual background. Thus, for example, a user who is conducting a video communication session indoors can appear to be in an outdoor location by changing their backdrop to a mountain, beach, or forest scene.

However, conventional virtual background techniques appear inauthentic due to inconsistencies between image properties of the foreground and the virtual background. The foreground can include an image of a user's person (face or body and face) and/or any other entities or objects that are captured by a camera of the user's endpoint device. Because the foreground is captured by the user's endpoint device, the image properties of the foreground may often contrast with the image properties of the virtual background, which is likely imaged by a different camera and/or at a different time or location. For example, placing a user who is currently in a dark room into a virtual environment that depicts a sunny outdoors scene will lack credibility, as the lighting of the user's face will not match the bright outdoors environment.

Accordingly, embodiments are presented herein that enable the matching of foregrounds and virtual backgrounds during a video communication session. Image properties of both the foreground and the virtual background are analyzed to identify and perform image processing operations to either the foreground, the virtual background, or both, in order to match the foreground and the virtual background. The image properties that are considered can include any properties of the foreground and/or background, such as brightness, color, exposure, sharpness, contrast, white balance, noise, camera focal length, resolution, and the like. Moreover, embodiments presented herein enable the recommending of virtual backgrounds that are particularly suitable to a current foreground based on the image properties of the foreground. Image processing operations, including virtual background replacement and matching of foregrounds and virtual backgrounds, are performed in real time (e.g., frames are processed at a rate equal to or faster than the frame rate of the video stream) so that realistic virtual background replacement can be provided to users during a live video communication session. Thus, the embodiments that are presented herein provide the practical application of realistic background replacement during video communication sessions.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

Embodiments will now be described in detail with reference to the Figures. FIG. 1 is a block diagram depicting a video conference system (or "system") 100 for video processing in accordance with an example embodiment. As depicted, system 100 includes one or more client devices 102A-102N, a communication session server 126, and a network 140. It is to be understood that the functional division among components of system 100 have been chosen for purposes of explaining various embodiments and is not to be construed as a limiting example.

Client devices 102A-102N each include a network interface (I/F) 104, at least one processor 106, a display 108, a microphone 110, a speaker 112, a camera 114, and memory 116 that includes a client module 118, a camera module 120, a background module 122, and a matching module 124. Each client device 102A-102N may include a laptop computer, a tablet computer, a netbook computer, a personal computer (PC), a desktop computer, a personal digital assistant (PDA), a smart phone, a video conferencing endpoint device, or any other programmable electronic device capable of executing computer readable program instructions. Network interface 104 enables each client device 102A-102N to send and receive data over a network, such as network 140. In general, a user of any client device of client devices 102A—102N may initiate and/or conduct video communication sessions with other participants, such as a user of another client device, during which the background of the user is replaced with a virtual background. Each client device 102A-102N may include internal and external hardware components, as depicted and described in further detail with respect to FIG. 9.

Display 108 may include any electronic visual display or screen capable of presenting information in a visual form. For example, display 108 may be a LCD, LED display, an electronic ink display, a touchscreen, and the like. Display 108 may present a graphical user interface that includes interface elements for the display of information related to initiating a communication session, conducting a communication session, and/or providing a virtual background during a communication session. During a communication session, still and/or video image data of one or more communication session participants may be presented to a user of any client device 102A-102N via display 108.

Microphone 110 may include any transducer capable of converting sound to an electrical signal, and speaker 112 may include any transducer capable of converting an electrical signal to sound. Together, microphone 110 and speaker 112 can support bidirectional audio communication between a local user (i.e. a communication session participant local to any of client devices 102A-102N) and a remote participant (e.g., a user local to another client device 102A-102N or other device).

Camera 114 may include any conventional or other image capture device capable of still and/or video data. Together, camera 114 and display 108 can support bidirectional video communication between a local participant (i.e. a participant local to any client device 102A—102N) and a remote participant. Camera 114 may be operated by one or more software modules of memory 116, such as camera module 120, and camera 114 may provide image property and/or camera setting information to one or more software modules of memory 116. Camera 114 may include hardware elements to enable the adjustment of the camera's settings, including aperture size, focal length, angle of view, and the like.

Client module 118, camera module 120, background module 122, and/or matching module 124 may include one or more modules or units to perform various functions of the embodiments described below. Client module 118, camera module 120, background module 122, and/or matching module 124 may be implemented by any combination of any quantity of software and/or hardware modules or units, and may reside within memory 116 of any of client devices 102A-102N for execution by a processor, such as processor 106.

Client module 118 enables a user of any of client devices 102A-102N to join, request to join, and/or participate in a video communication session. Client module 118 may create or join a communication session by transmitting a request to communication session module 134 of communication session server 126, which enables other participants to participate in the communication session. When client module 118 joins a communication session, client module 118 enables a user of the client device to communicate via video and/or audio in real-time with other participants. Client module 118 may exchange video and/or audio data with one or more client modules 118 of other client devices 102A-102N and/or other suitable devices. In various embodiments, client module 118 can transmit video and/or audio data directly to another device (e.g., by establishing a peer-to-peer connection), or communication session server 126 may facilitate the exchange of video and/or audio data between devices participating in a communication session. Client module 118 may exchange video data of a user that is captured by camera 114 or received from camera module 120; additionally, captured video data may be processed by background module 122 and/or matching module 124 prior to transmitting the video data to other communication session participants.

Camera module 120 obtains camera setting information that can be shared with background module 122 and/or matching module 124 in order to match a captured foreground image with a virtual background image. The information relating to the captured camera data may include any image properties, such as brightness, color, exposure, sharpness, contrast, white balance, noise, camera focal length, resolution, and the like, including any properties derived from other properties. In some embodiments, camera module 120 provides instructions to camera 114 to cause camera 114 to change one or more camera settings or options. For example, camera module 120 may cause camera 114 to perform an analog zoom operation or change the aperture ratio.

Background module 122 processes captured video data from camera 114 to provide a virtual background that replaces the captured background imagery. Initially, background module 122 extracts a foreground image, also referred to herein as a user image, from a frame of video. Background module 122 may employ conventional or other portrait segmentation techniques to segment a foreground image (e.g., a person, an object, or a portion thereof) from the background. In some embodiments, background module 122 extracts a foreground image using conventional or other machine learning techniques, such as applying a trained neural network to distinguish the foreground from the background. For example, a neural network may be trained to link each pixel in an image to a class label in order to classify the different parts of an image as either belonging to a person or as part of the background behind the person.

Background module 122 then combines an extracted foreground image with a virtual background to generate a frame of video that includes the foreground image (e.g., the user) overlaying the virtual background. Background module 122 may insert the extracted foreground image into any virtual background image; for example, the virtual background may be selected by a user, provided by the user, automatically suggested to the user, or randomly selected. The virtual background may be a static background or a dynamic background. For a static virtual background, a same virtual background image may be combined with the foreground image extracted from each frame of video captured by camera 114. A dynamic virtual background may be provided by pairing each frame of a background video with the foreground images extracted from each frame of video captured by camera 114 to achieve a "live" virtual background effect.

Matching module 124 performs image processing to match the foreground image and the corresponding virtual background image that are being combined by background module 122 for each frame of video in which background replacement is being performed. In general, matching module 124 analyzes the properties of a foreground image and the properties of a virtual background image to identify any adjustments that can be made to the foreground image and/or the virtual background image, and then makes the identified adjustments so that the foreground image and virtual background match each other.

Matching module 124 may identify image properties in the foreground image and virtual background image that include, but are not limited to, an exposure characteristic, an image brightness, a white point value, a tilt angle, a focal length, a dynamic range value, a sharpness value, a saturation value, a noise value, and the like. Some values may be identified by analyzing pixels of a foreground image or virtual background image, whereas other values may be provided as image metadata. For example, an exposure characteristic can be obtained as a property of camera 114, whereas an image brightness can be computed by analyzing the pixels of a virtual background image. Any conventional or other statistical techniques may be applied to derive image properties; for example, image brightness may be based on a mean of the red, green, and blue color coordinates of all pixels of a virtual background.

When matching module 124 identifies a difference between an image property of a foreground image and a corresponding image property of a virtual background image, matching module 124 may perform image processing to adjust either the foreground image, the virtual background image, or both, to match the foreground image and virtual background image. Matching module 124 may identify a match when an image property of a foreground image and a corresponding image property of a virtual background image fall within a threshold level of similarity to each other; thus, a match in image properties does not necessarily require identical values. In particular, a foreground image can be matched with a background image for a given image property by minimizing the difference in their values with respect to that image property. In some embodiments, the values of a foreground image and background image are not matched exactly, but rather, properties of the foreground and/or background image are adjusted to be less than, greater to, or within, a threshold minimum distance of each other. For example, when a foreground image is blurry, a background image may be blurred to a greater extent than the foreground image, as this may provide a more photorealistic effect. Matching module 124 may perform matching operations before, after, or simultaneously with background replacement operations performed by background module 122. In some embodiments, a frame is passed to client module 118 for transmission to one or more destinations after the frame has been processed by both background module 122 and matching module 124. Matching operations performed by matching module 124 are depicted and described in further detail with respect to FIGS. 3-7.

Communication session server 126 includes a network interface (I/F) 128, at least one processor 130, memory 132, and database 138. Memory 132 stores software instructions for a communication session module 134 and a background recommendation module 136. Communication session server 126 may include a rack-mounted server, or any other programmable electronic device capable of executing computer readable program instructions. Network interface 128 enables components of communication session server 126 to send and receive data over a network, such as network 140. In general, communication session server 126 enables user devices, such as client devices 102A-102N, to establish and conduct a communication session. Communication session server 126 may include internal and external hardware components, as depicted and described in further detail with respect to FIG. 9.

Communication session module 134 and background recommendation module 136 may include one or more modules or units to perform various functions of the embodiments described below. Communication session module 134 and background recommendation module 136 may be implemented by any combination of any quantity of software and/or hardware modules or units, and may reside within memory 132 of communication session server 126 for execution by a processor, such as processor 130.

Communication session module 134 enables communication session server 126 to facilitate communication sessions between devices, including the initiation of communication sessions and exchange of video and/or audio. In particular, communication session module 134 may act as an intermediary through which one or more client devices 102A-102N exchange video and/or audio with other client device 102A-102N or other devices. In some embodiments, communication session module 134 acts as an intermediary through which participants' devices exchange data for some or all of a communication session; in other embodiments, communication session module 134 facilitates the initiation of peer-to-peer connections between the computing devices of participants, which may subsequently exchange audio and/or video such that the data is not transmitted through communication session server 126.

Background recommendation module 136 may receive data, including image data captured by camera 114 of any of client devices 102A-102N and other data, in order to recommend one or more virtual backgrounds based on analysis of the received data. In particular, background recommendation module 136 may receive a data package that includes data such as a focal length of camera 114, image properties, scene data, and time of day and location data. Background recommendation module 136 may analyze the data included in the data package by processing a set of virtual background images to select a subset of virtual background images that best match the image properties and other data of the data package. Background recommendation module 136 may transmit the subset of virtual background images to the client device requesting a background recommendation, and a user may then make a selection of a background image in particular to utilize as a virtual background.

Database 138 may include any non-volatile storage media known in the art. For example, database 138 can be implemented with a tape library, optical library, one or more independent hard disk drives, or multiple hard disk drives in a redundant array of independent disks (RAID). Similarly, data in database 138 may conform to any suitable storage architecture known in the art, such as a file, a relational database, an object-oriented database, and/or one or more tables. Database 138 may store data including virtual background images, received data packages for automatic background recommendations, and any other data or metadata relating to hosting communication sessions in which background replacement is provided in accordance with presented embodiments.

Network 140 may include a local area network (LAN), a wide area network (WAN) such as the Internet, or a combination of the two, and includes wired, wireless, or fiber optic connections. In general, network 140 can be any combination of connections and protocols known in the art that will support communications between client devices 102A-102N and/or communication session server 126 via their respective network interfaces in accordance with the described embodiments.

Figure 2A:
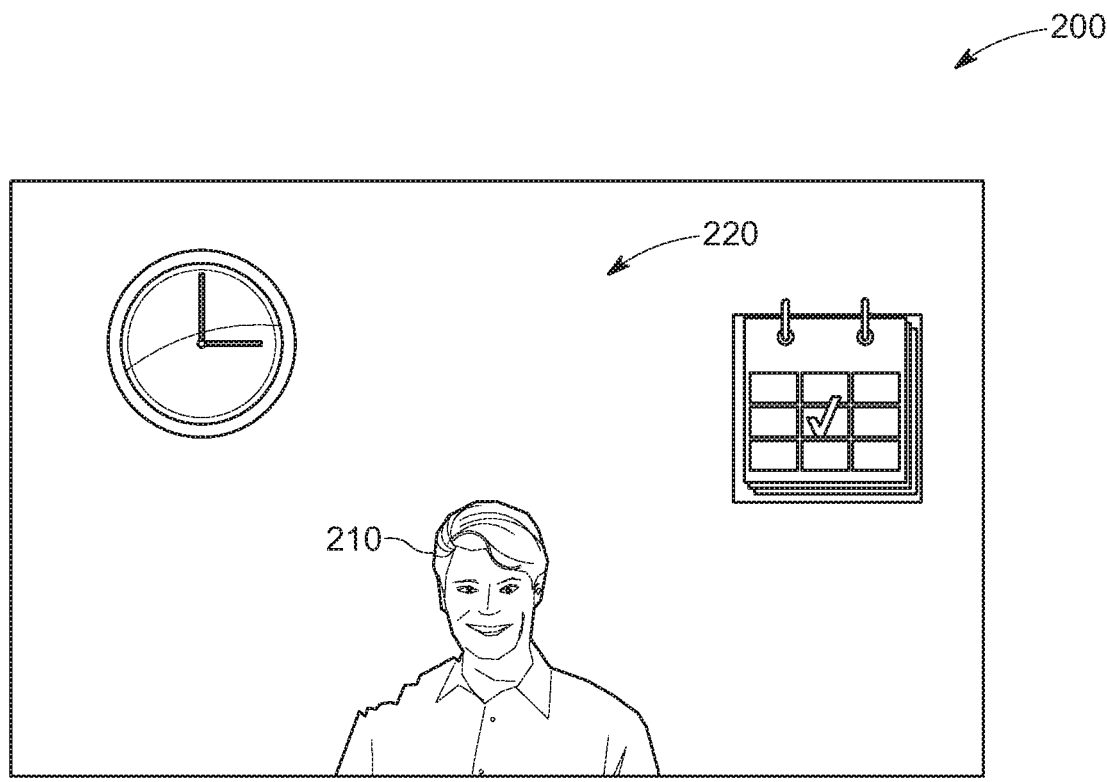
FIG. 2A depicts a video frame before processing to match a foreground and a virtual background in accordance with an example embodiment.

FIG. 2A depicts a video frame 200 before processing to match a foreground and a virtual background in accordance with an example embodiment. As depicted, frame 200 includes a foreground image 210 and a background image 220. Foreground image 210 is a user image that includes a user's person (head, face, body, etc.), which can be extracted using the image processing techniques described herein to insert the foreground image over a virtual background. Background image 220 depicts the actual environment of the user as captured by a camera, which is an indoor environment in the depicted example.

Figure 2B:
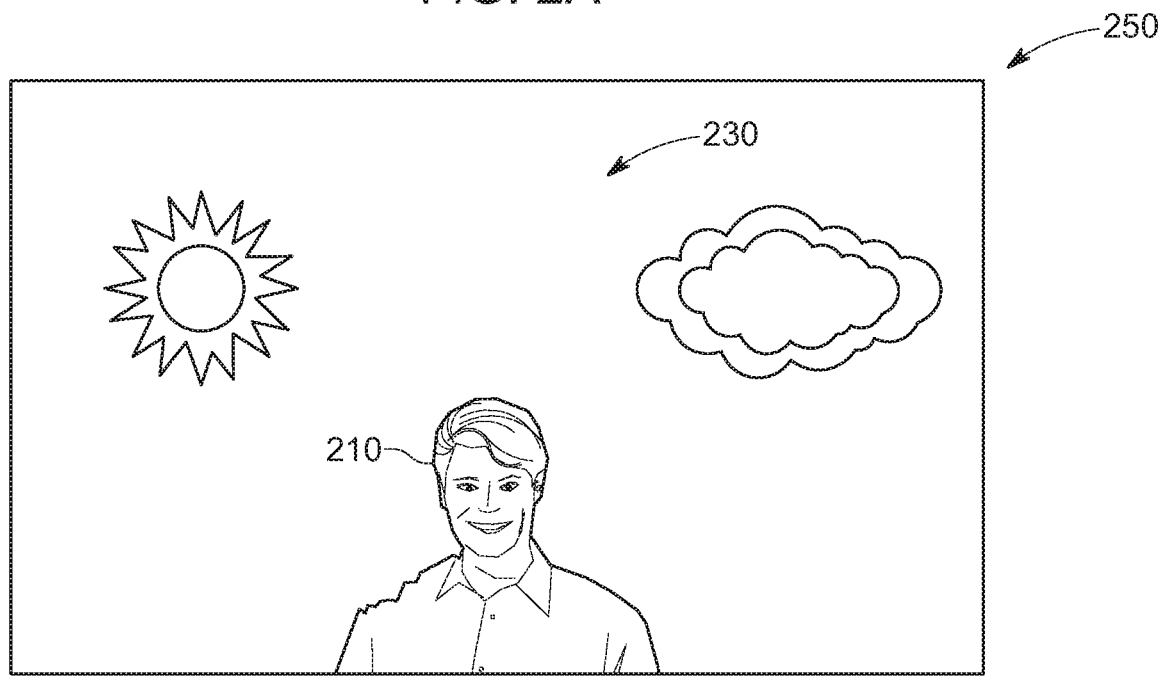
FIG. 2B depicts a video frame after processing to match a foreground and a virtual background in accordance with an example embodiment.

FIG. 2B depicts a video frame 250 after processing to match a foreground and a virtual background in accordance with an example embodiment. After extracting user image 210 and selecting a virtual background 230, matching module 124 analyzes and adjusts foreground image 210 and/or virtual background 230 to match foreground image 210 to virtual background 230. For example, since virtual background 230 depicts a sunny, outdoor environment, user image 210 may require an adjustment to increase the brightness (not specifically shown in FIG. 2A due to the difficulty to show in a line drawing). Once foreground image 210 and virtual background 230 are adjusted to match, foreground image 210 and virtual background 230 are combined to produce video frame 250, which can be transmitted to a destination.

Figure 3:
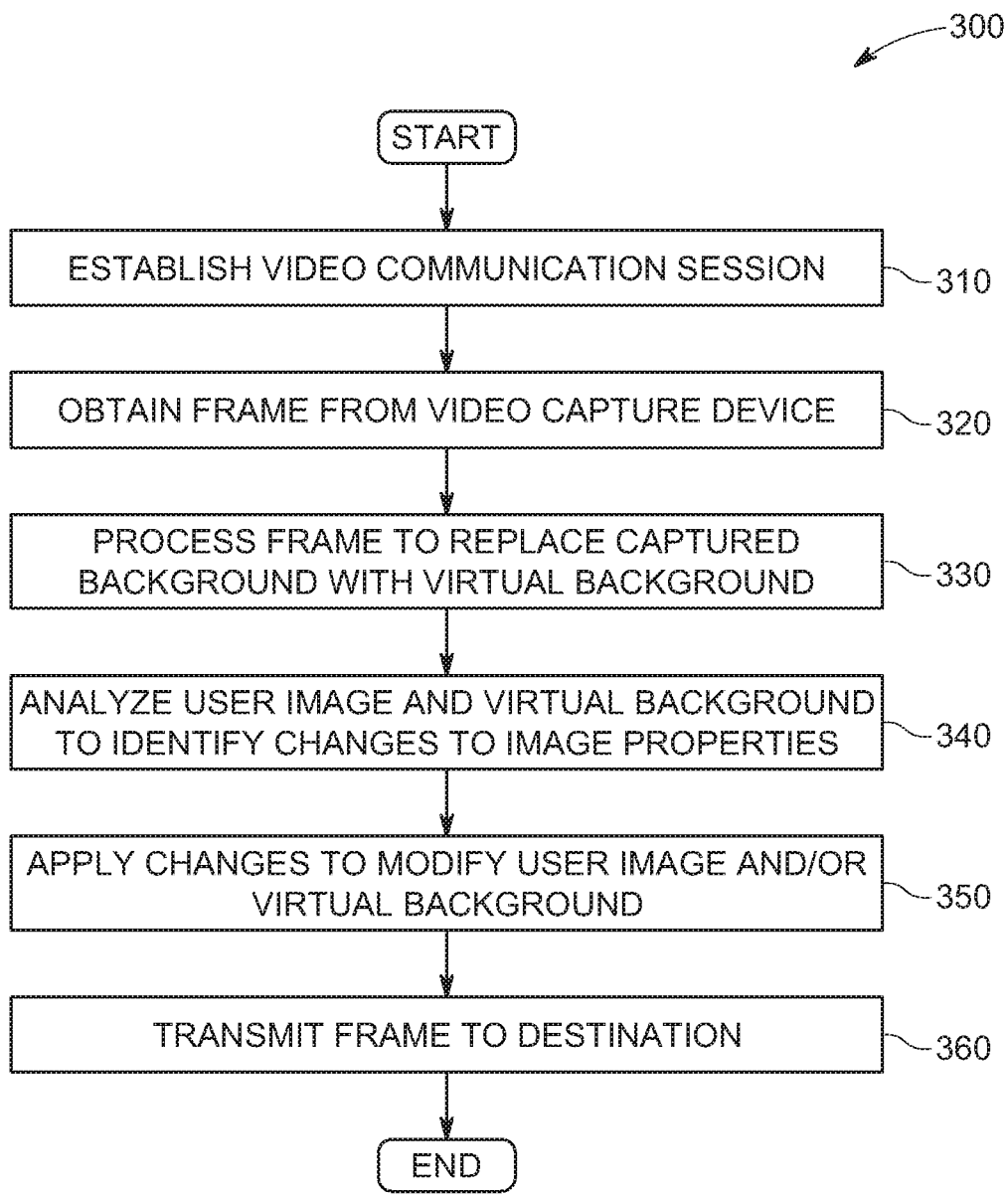
FIG. 3 is a flow chart depicting a method for matching a foreground and a virtual background during a video communication session in accordance with an example embodiment.

FIG. 3 is a flow chart depicting a method 300 for matching a foreground and a virtual background during a video communication session in accordance with an example embodiment.

A video communication session is established at operation 310. The video communication session can be established between two or more participants each using an endpoint device, such as client devices 102A-102N. Communication session data, including audio and/or video data obtained from the endpoint devices of participants, can be exchanged via a server, such as communication session server 126, or the data may directly be exchanged between participating client devices 102A-102N (i.e., via a peer-to-peer connection).

A frame is obtained from the video capture device at operation 320. Before transmitting video from a user's client device to the client devices of other participants, the video is processed on a frame-by-frame basis by providing each frame to background module 122 in order to extract a user image from the original background.

The frame is processed to replace the captured background with a virtual background at operation 330. A user-selected or other virtual background is provided to replace the actual background captured by camera 114. Background module 122 may use conventional or other image processing techniques, including neural network-based techniques or other machine learning-based techniques, to identify the portion of a frame that corresponds to the user's person, which may include any portion of a user's body (e.g., face, head, shoulders) that are in view of camera 114.

The user image and the virtual background are analyzed to identify changes to their images properties at operation 340. Matching module 124 determines image properties for each of the user image and the virtual background, including brightness, color, exposure, sharpness, contrast, white balance, noise, camera focal length, resolution, and the like. The image properties of the user image are compared to the corresponding image properties of the virtual background to identify particular image properties of the user image that differ from the virtual background. Once the differences in values of image properties are identified, matching module 124 determines operations that can be applied to the user image and/or the virtual background to reduce or eliminate the differences in the values of their image properties. In some embodiments, the values of the image properties are modified to optimize, rather than reduce or eliminate, a difference between the user image and virtual background. A user image and/or virtual background may be modified such that the difference between one or more values of the user image and the virtual background is equal to or approximately equal to a predetermined value.

The identified changes are applied to modify the user image and/or the virtual background at operation 350. Matching module 124 may modify the virtual background to match the user image, and/or may modify the user image to match the virtual background. In some embodiments, matching module 124 may modify both the user image and virtual background. For example, when a user image is brighter than a virtual background, the brightness of a user image may be decreased while the brightness of a virtual background is increased. As another example, some operations, such as brightness and color matching, may be performed on the user image, whereas other operations, such as addition of noise, may be performed on the virtual background. Matching module 124 may determine whether to modify the user image, the virtual background, or both, or a user may manually identify whether to modify either or both. Further, if both the user image and virtual background are being modified to match each other, a user may select one to be prioritized over the other The frame is transmitted to a destination at operation 360. The user image and virtual background are combined after being processed by matching module 124 and the resulting frame is transmitted to the devices of participants in a video communication session, either directly or via communication session server 126. Method 300 can be applied to each frame in a video communication session to ensure that adjustments are made throughout the communication session in order to address any variations of user image properties from one frame to another.

Figure 4:
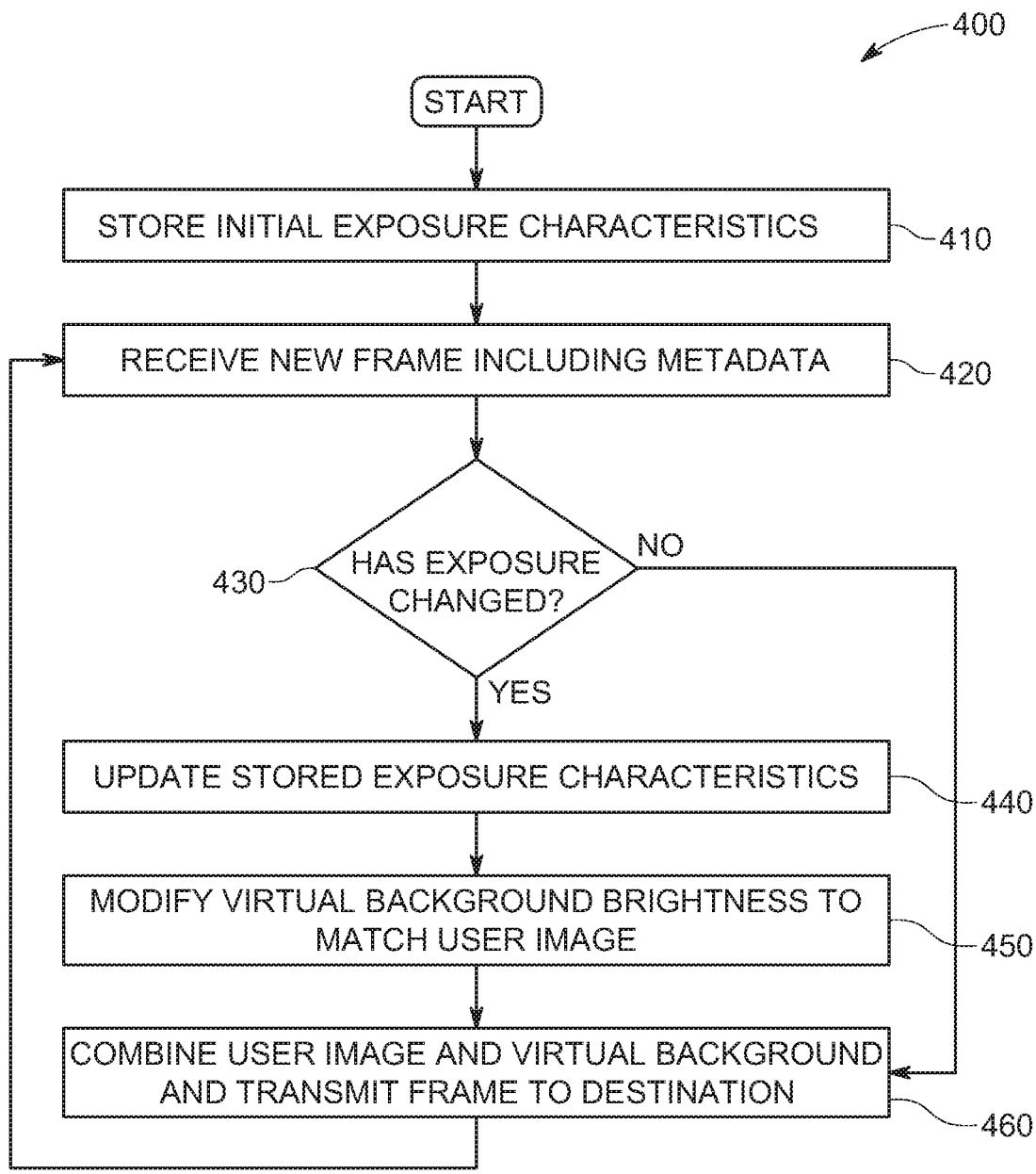
FIG. 4 is a flow chart depicting a method for matching a brightness of a foreground and a virtual background in accordance with an example embodiment.

FIG. 4 is a flow chart depicting a method 400 for matching a brightness of a foreground and a virtual background in accordance with an example embodiment.

Initial exposure characteristics of a camera are stored at operation 410. The initial exposure characteristics may be obtained from camera 114 by one or more software modules, such as camera module 120 or matching module 124. The metric for exposure may include an International Organization for Standardization (ISO) value or other similar metric. Additionally or alternatively, default exposure characteristics may include gain values, which can be measured in units of bels or decibels (dB).

A new frame including metadata from a camera sensor is received at operation 420. The metadata includes exposure characteristics for the associated frame, which can be obtained by camera 114.

Operation 430 determines whether the exposure characteristics have changed. Matching module 124 may compare the default exposure characteristics to the exposure characteristics associated with the new frame obtained at operation 420 to determine whether the exposure characteristics have changed. In general, exposure characteristics will change when there is a change in the amount of light entering camera 114, such as when a user toggles a light switch, opens a curtain, moves away from a light source, and the like. If the exposure characteristics have not changed, then the user image and the virtual background are combined and the resulting frame is transmitted to a destination.

If the exposure characteristics have changed, then the stored exposure characteristics are updated at operation 440, and the virtual background brightness is modified to match the user image at operation 450. In some embodiments, the virtual background may have already been modified from its original brightness level to match the default exposure characteristics of camera 114, or the virtual background may have been modified due to a prior change in exposure settings. Matching module 124 may employ conventional or other image processing techniques to adjust the brightness level of the virtual background. In general, and as an example, when the brightness of the foreground increases due to changed exposure, the brightness of the virtual background is increased, and when the exposure characteristics of the new frame are less than the stored exposure characteristics, the brightness of the virtual background is decreased. In some embodiments, the brightness of the user image may additionally or alternatively be adjusted in order to match the brightness of the user image to the virtual background.

The foreground and virtual background are combined and the resulting frame is transmitted to a destination at operation 460. After matching module 124 makes the identified adjustments, then the user image and virtual background are merged, and the resulting frame is transmitted to a destination (e.g., to endpoint devices of other participants in a video communication session). After transmitting the resulting frame to the destination, a next frame is received at operation 420. In some embodiments, two or more images may be processed in parallel. When multiple images are processed at the same time, processing of a next frame can begin before processing of a current frame is finalized.

Figure 5:
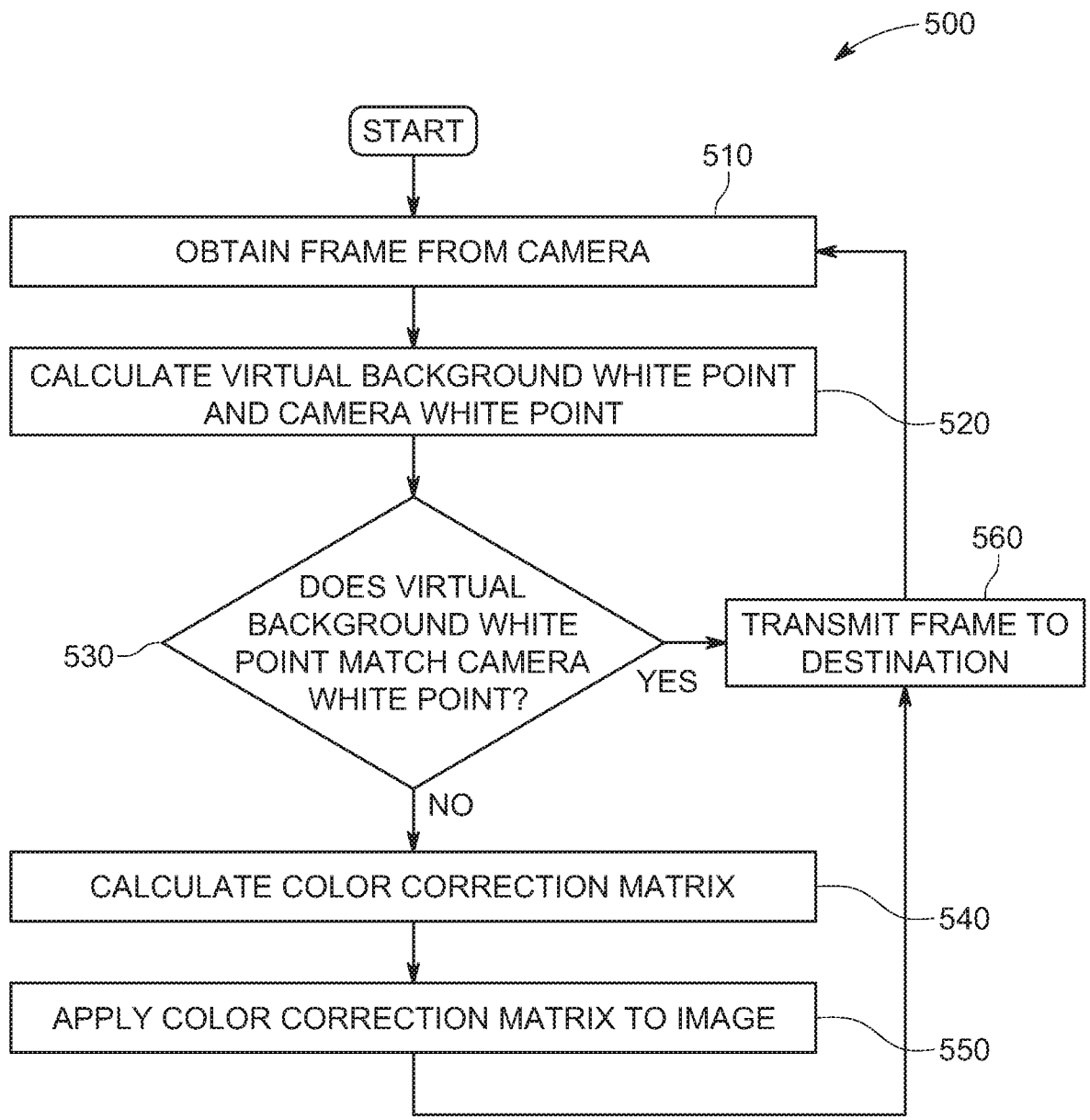
FIG. 5 is a flow chart depicting a method for matching a white balance/white point of a foreground and a virtual background in accordance with an example embodiment.

FIG. 5 is a flow chart depicting a method 500 for matching a white balance/white point of a foreground and a virtual background in accordance with an example embodiment.

A frame is obtained from a camera at operation 510. The frame may be obtained or received by matching module 124 from camera 114 during a video communication session. Matching module 124 processes obtained frames to extract the user image from the captured background image in order to match the user image and virtual background before superimposing the user image over the virtual background.

A virtual background white point characteristic and a camera white point characteristic are calculated at operation 520. Matching module 124 analyzes each of the virtual background and the user image to obtain a respective virtual background white point characteristic and a camera white point characteristic. The white point characteristic can be obtained according to any conventional or other image analysis techniques, and can be expressed as a set of tristimulus values or chromaticity coordinates that serve to define the color "white" in the analyzed image data.

Operation 530 determines whether the virtual background white point characteristic matches the camera white point characteristic. The tristimulus values or chromaticity coordinates of each of the virtual background and user image are compared to determine whether there is a match. The white point characteristic of each of the virtual background and user image may include an overall value or set of values, or there may be multiple white point characteristics for various regions of each image. For example, when half of a user's face is illuminated, a separate white point characteristic may be derived for a left and right side of the user's face, which can be compared to separate white point characteristics for a left and right portion of the virtual background. If the virtual background white point characteristic matches the camera white point characteristic, then the user image and the virtual background are merged and the resulting frame is transmitted to a destination at operation 560.

If the virtual background white point characteristic does not match the camera white point characteristic, a color correction matrix is calculated at operation 540. Matching module 124 calculates a color correction matrix that, when applied to the virtual background, transforms the pixels of the virtual background to reduce or eliminate the difference between the white point of the resulting (i.e. transformed) virtual background and the white point of the user image. Similarly, a color correction matrix can be computed and applied to a foreground to match the foreground to the virtual background. In some embodiments, the matrix is calculated using a Bradford color adaption transform function.

Once calculated, the color correction matrix is applied to the virtual background at operation 550. Matrix multiplication is performed on each pixel's red, green, and blue values. After applying the color correction matrix, the resulting frame is transmitted to a destination at operation 560. After transmitting the resulting frame to the destination, a next frame is obtained at operation 510.

Figure 6:
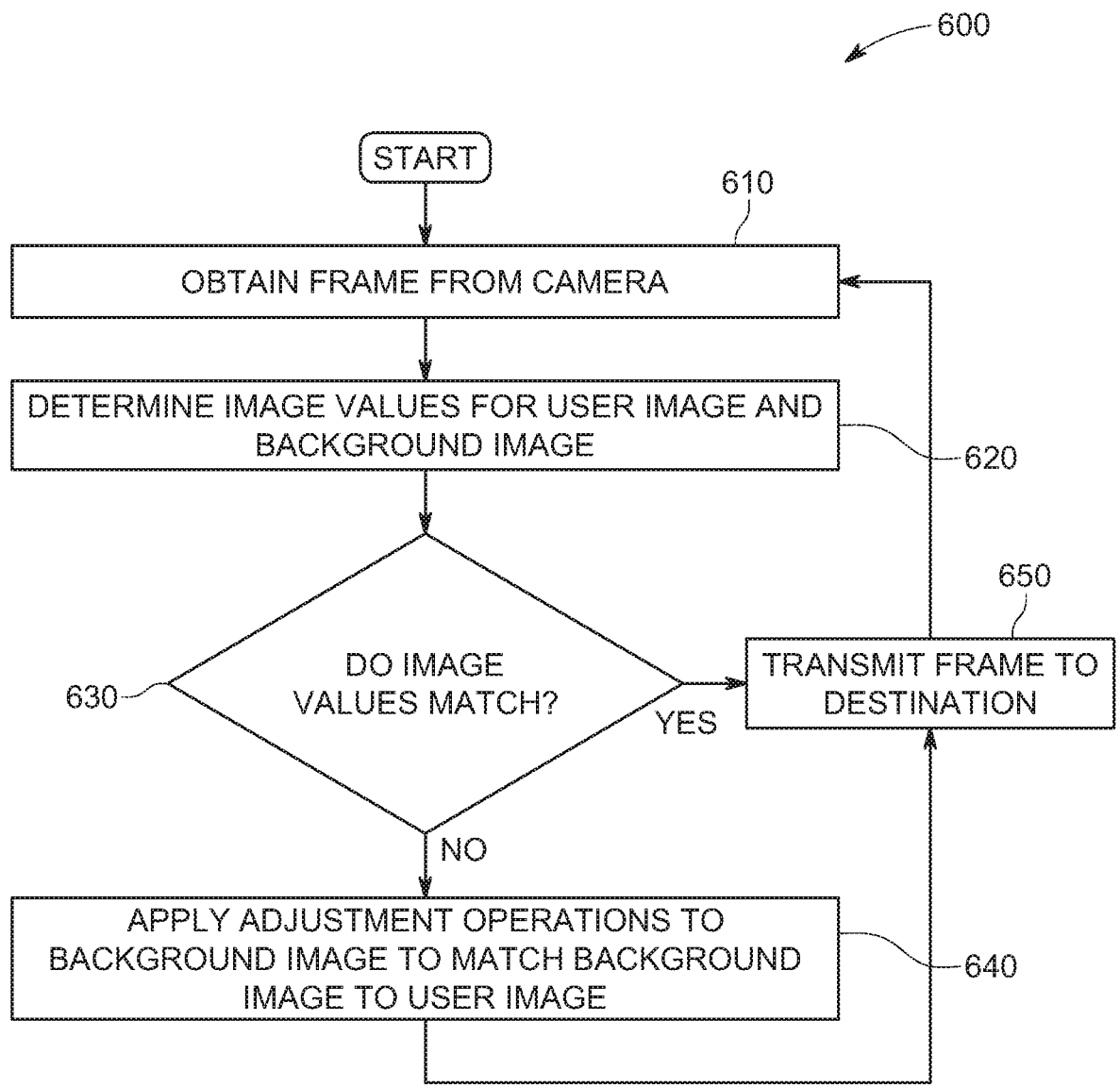
FIG. 6 is a flow chart depicting a method for matching image properties of a foreground and a virtual background in accordance with an example embodiment.

FIG. 6 is a flow chart depicting a method 600 for matching image properties of foreground and a virtual background in accordance with an example embodiment.

A frame is obtained from a camera at operation 610. The frame may be obtained or received by matching module 124 from camera 114 during a video communication session. Matching module 124 processes obtained frames to extract the user image from the captured background image in order to match the user image and virtual background before superimposing the user image over the virtual background.

Image values for the user image and the background image are determined at operation 620. Matching module 124 can obtain each image value using any appropriate analytical technique for that value. Image values may include dynamic range (i.e., contrast), saturation, sharpness, noise, and the like. To evaluate each image for dynamic range or contrast values, a luminosity histogram can be employed to identify a range of intensities in the analyzed image. To evaluate each image for saturation, the analyzed image can be converted to a perceptual color space to estimate the overall "colorfulness" of the image. Sharpness can be evaluated by applying a high pass finite impulse response (FIR) filter. Noise can be evaluated based on a predetermined association between an ISO value of camera 114 and the amount of noise in a captured image; additionally or alternatively, a high pass filter can be applied to detect grain.

Operation 630 determines whether the image values match. If the image values match, then a frame resulting from combining the user image and the virtual background is transmitted to a destination at operation 650. After transmitting the resulting frame to the destination, a next frame is obtained at operation 610.

If any of the dynamic range and contrast, saturation, sharpness, and/or noise values of the user image and the virtual background do not match, then adjustments to the background image are applied at operation 640 to match the background image to the user image. In particular, if the dynamic range or contrast does not match, then dynamic range compression can be applied to virtual background to degrade the virtual background until the virtual background matches the user image. If the saturation does not match, then saturation of the virtual background can be reduced to match the user image by reducing one or more chrominance components of the virtual background, including blue projection (U) and/or red projection (V) in a YUV color space. The sharpness of a virtual background can be reduced to match a blurry user image by applying a blurring operation to the virtual background, such as a lens blur or plain Gaussian blur technique. In some embodiments, the identified adjustments can enable matching of a user image and a virtual background even when one or both of the user image and virtual background have already been modified or pre-processed to include an artistic or other effect. For example, a user image that is in color can be desaturated to match a black-and-white or greyscale background, a user image can be modified to match a virtual background upon which a color filter, such as a red filter, has been applied, or a virtual background can be modified to match a user image that has been modified to have inverted colors, appear as a freehand sketch or cartoon, and the like.

After any identified adjustments are applied, the resulting frame is transmitted to a destination at operation 650. After transmitting the resulting frame to the destination, a next frame is obtained at operation 610.

Figure 7:
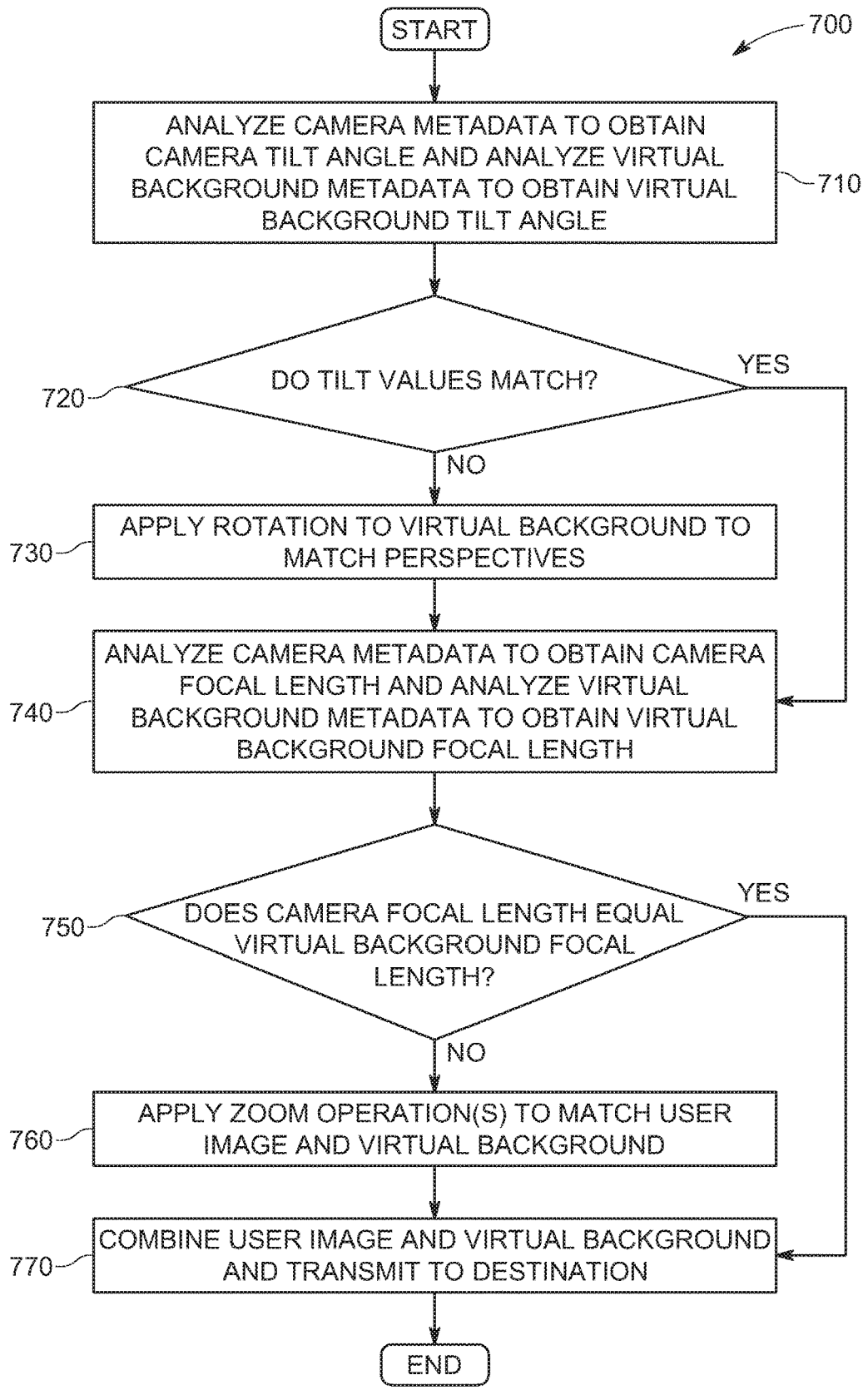
FIG. 7 is a flow chart depicting a method for matching tilt and focal length attributes of a foreground and a virtual background in accordance with an example embodiment.

FIG. 7 is a flow chart depicting a method 700 for matching tilt and focal length attributes of a foreground and a virtual background in accordance with an example embodiment.

Camera metadata is analyzed to obtain a camera tilt angle, and virtual background metadata is analyzed to obtain a virtual background tilt angle at operation 710. Matching module 124 can obtain a tilt angle from camera 114 either by accessing system information of the client device or by analyzing metadata of images provided by camera 114 (e.g., Exchangeable image file (Exif) metadata). A virtual background's metadata can be analyzed to obtain a camera tilt angle for the virtual background, which can be a feature of the imaging device used to capture the virtual background image.

Operation 720 determines whether the tilt angle values match. If the tilt values do not match, a rotation is applied at operation 730 to the virtual background to match the perspective of the virtual background to the user image. In particular, the virtual background can be rotated by an angle equal to the difference between the camera tilt angle and the virtual background tilt angle so that the virtual background is transformed to match the tilt of the user image.

If the tilt values match, or once the virtual background has been rotated, then camera metadata is analyzed to obtain a camera focal length and the virtual background metadata is analyzed to obtain a virtual background focal length at operation 740. Matching module 124 can obtain a camera focal length from camera 114 either by accessing system information of the client device or by analyzing metadata of images provided by camera 114. A virtual background's metadata can be analyzed to obtain a virtual background focal length, which can be a feature of the imaging device used to capture the virtual background image.

Operation 750 determines whether the camera focal length is equal to the virtual background focal length. If the focal lengths are not equal, at 760, one or more zoom/magnification operations are applied to match the user image and the virtual background. A zoom operation can increase or decrease the size of the user image relative to the virtual background by changing the size of the user image and/or the virtual background. For example, if the virtual background focal length is greater than the camera focal length, then matching module 124 can decrease the size of the user image and/or increase the size of the virtual background. Matching module 124 may perform other matching operations, such as sharpness adjustment and noise adjustment, after the zoom operation if the applied zoom operation impacted the image properties related to those other matching operations.

Once the identified zoom operations are performed, the user image is combined with the virtual background and the resulting frame is transmitted to a destination at operation 770.

Figure 8:
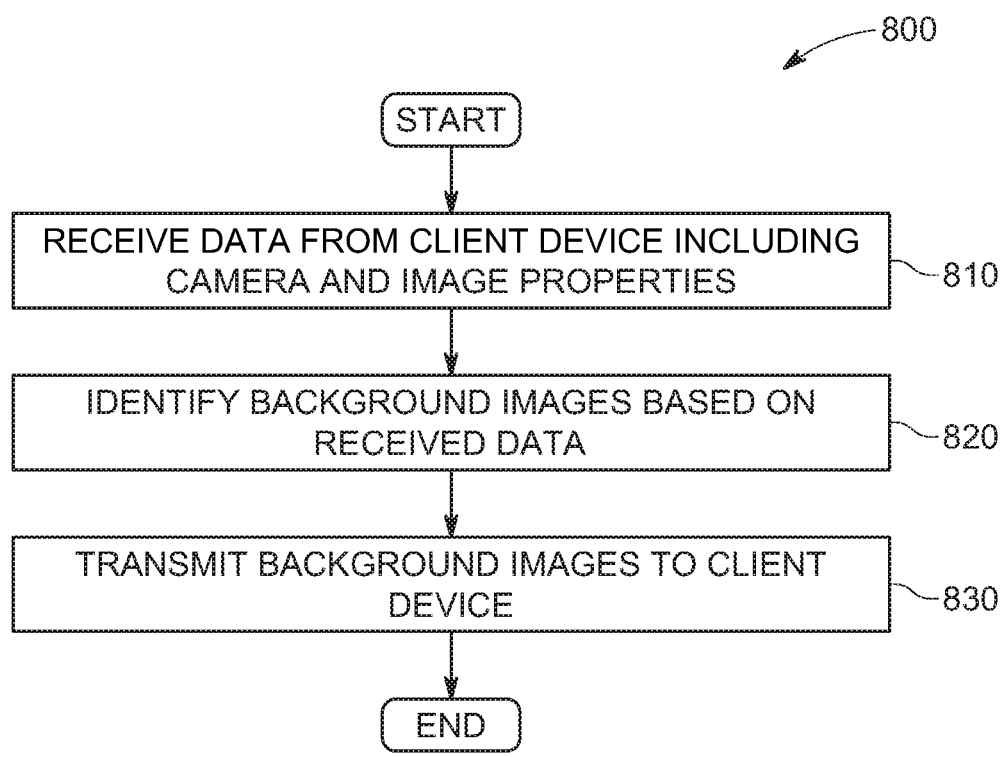
FIG. 8 is a flow chart depicting a method for recommending a virtual background in accordance with an example embodiment.

FIG. 8 is a flow chart depicting a method 800 for recommending a virtual background in accordance with an example embodiment.

Data from a client device including camera and image properties is received at operation 810. The client device, such as any of client devices 102A-102N, initially requests a recommendation of one or more virtual backgrounds from communication session server 126. The requesting device can submit a data package that includes camera and image properties of the requesting device. The data package may include properties of the camera (e.g., camera 114) and properties of an image captured by the camera. As such, the data package may include a camera focal length, image properties such as the relative illumination of a scene (measured in e.g., lux), including illumination of the user's face, one or more white point characteristics, one or more contrast characteristics, one or more dynamic range characteristics, and scene data, including a person's submitted or estimated age, appearance, time of day, day of year, and geographical location.

One or more background images are identified based on the received data at operation 820. Background recommendation module 136 can process the data package to select a subset of virtual backgrounds that can be recommended to the user based on the submitted data. For example, given the time of day and location, background images can be selected that were taken at a similar time of day, day of year, and/or location. If a portion of a user's face is illuminated, a virtual background can be recommended that depicts a light source in a location that would correspond to the illuminated portion of the user's face. In some embodiments, background recommendation module 136 performs operations substantially similar to matching module 124 in order to identify virtual backgrounds whose image properties are closest to the image properties of a sample image provided in the data package. In some embodiments, a set of virtual backgrounds can be ranked according to their relevance based on one or more of the values of the data package, and a subset of virtual backgrounds can be selected based on a selection criterion, such as a top number of virtual backgrounds. In some embodiments, a series of background images showing a same scene but at different times of day (e.g., sunrise, midday, sunset, night, etc.) may be selected, and a correct image can be selected based on the received time of day data; the foreground image and background image can then be matched accordingly.

The background images are transmitted to the requesting client device at operation 830. A subset of background images can be transmitted to the requesting device, or a link to the subset of backgrounds can be provided to the requesting device. Once a user receives a recommendation of one or more virtual backgrounds, the user can select one for background replacement during a video communication session.

Figure 9:
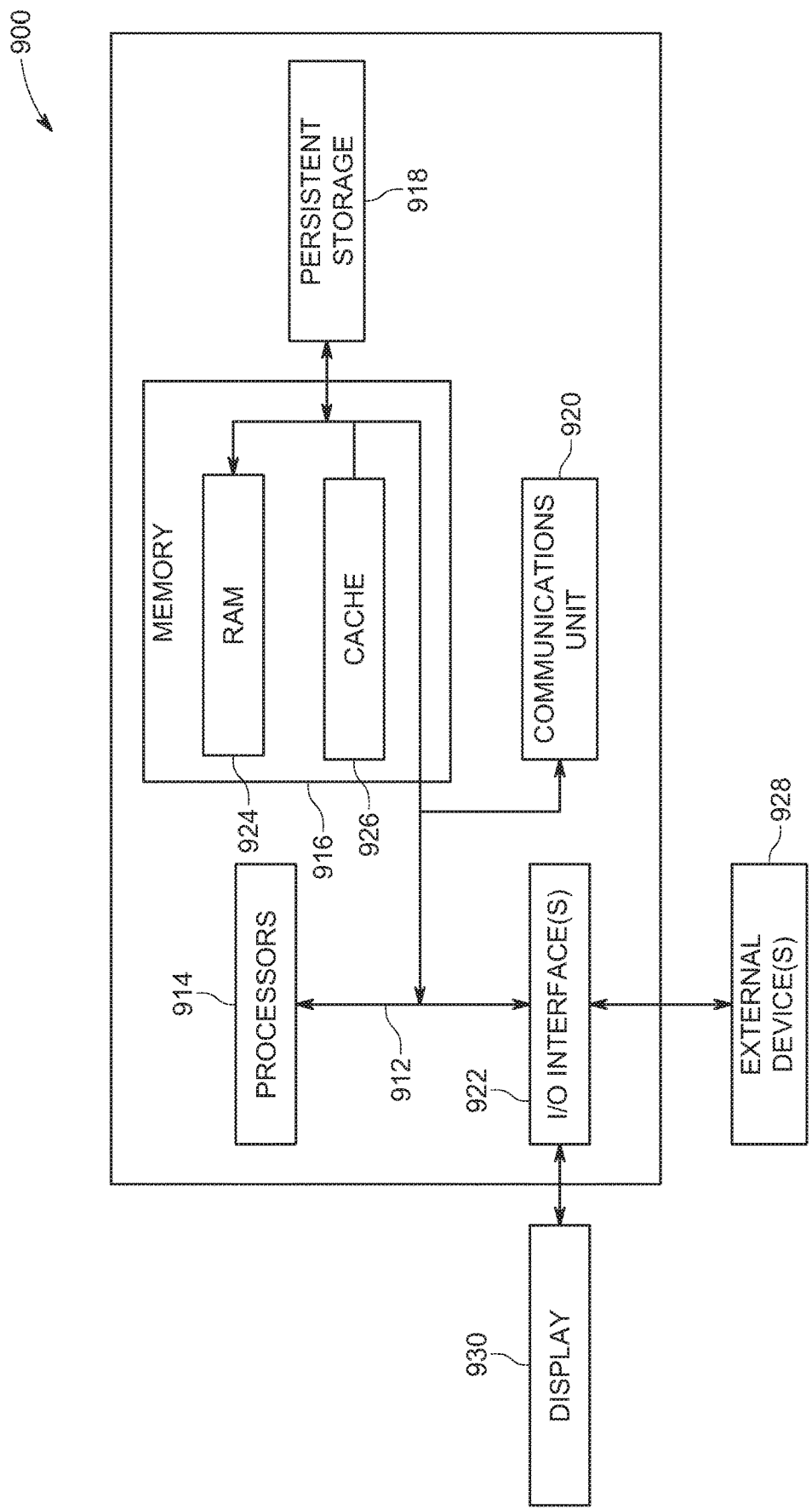
FIG. 9 is a block diagram depicting a computing device in accordance with an example embodiment.

FIG. 9 is a block diagram depicting components of a computing device 900 suitable for executing the methods disclosed herein. Computing device 900 may be representative of a computing device suitable for an implementation of some or all of the functions of client devices 102A-102N and/or communication session server 126 in accordance with example embodiments. It should be appreciated that FIG. 9 provides only an illustration of one embodiment and does not imply any limitations with regard to the environments in which different embodiments may be implemented. Many modifications to the depicted environment may be made.

As depicted, the computing device 900 includes communications fabric 912, which provides communications between computer processor(s) 914, memory 916, persistent storage 918, communications unit 920, and input/output (I/O) interface(s) 922. Communications fabric 912 can be implemented with any architecture designed for passing data and/or control information between processors (such as microprocessors, communications and network processors, etc.), system memory, peripheral devices, and any other hardware components within a system. For example, communications fabric 912 can be implemented with one or more buses.

Memory 916 and persistent storage 918 are computer readable storage media. In the depicted embodiment, memory 916 includes random access memory (RAM) 924 and cache memory 926. In general, memory 916 can include any suitable volatile or non-volatile computer readable storage media.

One or more programs may be stored in persistent storage 918 for execution by one or more of the respective computer processors 914 via one or more memories of memory 916, which programs enable the execution of the operations described herein in connection with FIGS. 1-8. The persistent storage 918 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 918 may also be removable. For example, a removable hard drive may be used for persistent storage 918. Other examples include optical and magnetic disks, thumb drives, and smart cards that are inserted into a drive for transfer onto another computer readable storage medium that is also part of persistent storage 918.

Communications unit 920, in these examples, provides for communications with other data processing systems or devices. In these examples, communications unit 920 includes one or more network interface cards. Communications unit 920 may provide communications through the use of either or both physical and wireless communications links.

I/O interface(s) 922 allows for input and output of data with other devices that may be connected to device 900. For example, I/O interface 922 may provide a connection to external devices 928 such as a keyboard, keypad, a touch screen, and/or some other suitable input device. External devices 928 can also include portable computer readable storage media such as, for example, thumb drives, portable optical or magnetic disks, and memory cards.

Software and data used to practice embodiments can be stored on such portable computer readable storage media and can be loaded onto persistent storage 918 via I/O interface(s) 922. I/O interface(s) 922 may also connect to a display 930. Display 930 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the described embodiments should not be limited to use solely in any specific application identified and/or implied by such nomenclature.

Data relating to background replacement during a video communication session (e.g., video and/or audio data captured from and/or presented to users, user image data, user image properties, virtual background image data, virtual background image properties, camera properties and metadata, neural network data, etc.) may be stored within any conventional or other data structures (e.g., files, arrays, lists, stacks, queues, records, etc.) and may be stored in any desired storage unit (e.g., database, data or other repositories, queue, etc.). The data transmitted between client devices 102A-102N and/or communication session server 126 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to background replacement during a video communication session (e.g., video and/or audio data captured from and/or presented to users, user image data, user image properties, virtual background image data, virtual background image properties, camera properties and metadata, neural network data, etc.) may include any information provided to, or generated by, client devices 102A-102N and/or communication session server 126. Data relating to background replacement during a video communication session may include any desired format and arrangement, and may include any quantity of any types of fields of any size to store any desired data. The data relating to background replacement during a video communication session may include any data collected about entities by any collection mechanism, any combination of collected information, and any information derived from analyzing collected information.

The present embodiments may employ any number of any type of user interface (e.g., Graphical User Interface (GUI), command-line, prompt, etc.) for obtaining or providing information (e.g., data relating to background replacement during a video communication session), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of performing background replacement during a video communication session.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., communications software, server software, client module 118, camera module 120, background module 122, matching module 124, communication session module 134, background recommendation module 136, etc.). These systems may include any types of monitors and input devices (e.g., keyboard, mouse, voice recognition, etc.) to enter and/or view information.

It is to be understood that the software (e.g., communications software, server software, client module 118, camera module 120, background module 122, matching module 124, communication session module 134, background recommendation module 136, etc.) of the present embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control.

The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present embodiments (e.g., communications software, server software, client module 118, camera module 120, background module 122, matching module 124, communication session module 134, background recommendation module 136, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

The system may employ any number of any conventional or other databases, data stores or storage structures (e.g., files, databases, data structures, data or other repositories, etc.) to store information (e.g., data relating to background replacement during a video communication session). The database system may be implemented by any number of any conventional or other databases, data stores or storage structures (e.g., files, databases, data structures, data or other repositories, etc.) to store information (e.g., data relating to background replacement during a video communication session). The database system may be included within or coupled to the server and/or client systems. The database systems and/or storage structures may be remote from or local to the computer or other processing systems, and may store any desired data (e.g., data relating to background replacement during a video communication session).

The present embodiments may employ any number of any type of user interface (e.g., Graphical User Interface (GUI), command-line, prompt, etc.) for obtaining or providing information (e.g., data relating to conferencing), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present embodiments are not limited to the specific tasks or algorithms described above, but may be utilized for any number of applications in the relevant fields, including, but not limited to, video processing to combine live captured imagery with virtual imagery.

The terminology used herein is for the purpose of describing particular embodiments only and is not intended to be limiting of the described embodiments. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the described embodiments. The embodiments were chosen and described in order to enable others of ordinary skill in the art to understand the various embodiments with various modifications as are suited to the particular use contemplated.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present embodiments may be a system, a method, and/or a computer program product at any possible technical detail level of integration. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one form, a method is provided comprising: obtaining, from a video capture device as part of a video stream, a frame comprising a user image and a captured background; processing the frame to replace the captured background with a virtual background; determining a change to an exposure characteristic of the video capture device; in response to determining the change to the exposure characteristic, modifying the virtual background to match a virtual background brightness with a user image brightness to produce a modified virtual background; and modifying the frame by combining the user image with the modified virtual background. In a further form, the method includes determining a video capture device focal length and a virtual background focal length; and applying a zoom to the virtual background to match the video capture device focal length to the virtual background focal length.

In another form, in response to determining the change to the exposure characteristic, modifying the user image brightness in combination with the modifying of the virtual background to match the virtual background brightness and the user image brightness.

In another form, modifying the virtual background further comprises: determining a virtual background white point value and a user image white point value; and applying a color correction matrix to match the virtual background white point value and the user image white point value.

In another form, modifying the virtual background further comprises: determining a virtual background tilt angle and a video capture device tilt angle; and applying a rotation to the virtual background based on a difference between the video capture device tilt angle and the virtual background tilt angle.

In another form, modifying the virtual background further comprises: determining one or more user image values including a dynamic range value, a sharpness value, a saturation value, and a noise value; and applying one or more adjustments to match the virtual background to the user image based on the one or more user image values.

In another form, the virtual background is recommended to the user based on one or more of: a focal length of the video capture device, an appearance of the user, a time of day, and a location of the user.

In one form, a computer system is provided, comprising: one or more computer processors; one or more computer readable storage media; program instructions stored on the one or more computer readable storage media for execution by at least one of the one or more computer processors, the program instructions comprising instructions to: obtain, from a video capture device as part of a video stream, a frame comprising a user image and a captured background; process the frame to replace the captured background with a virtual background; determine a change to an exposure characteristic of the video capture device; in response to determining the change to the exposure characteristic, modify the virtual background to match a virtual background brightness with a user image brightness to produce a modified virtual background; and modify the frame by combining the user image with the modified virtual background.

In one form, one or more computer readable storage media is provided, the one or more computer readable storage media collectively having program instructions embodied therewith, the program instructions executable by a computer to cause the computer to: obtain, from a video capture device as part of a video stream, a frame comprising a user image and a captured background; process the frame to replace the captured background with a virtual background; determine a change to an exposure characteristic of the video capture device; in response to determining the change to the exposure characteristic, modify the virtual background to match a virtual background brightness with a user image brightness to produce a modified virtual background; and modify the frame by combining the user image with the modified virtual background.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A computer-implemented method comprising:
obtaining, from a video capture device as part of a video stream, a frame comprising a user image and a captured background;

processing the frame to replace the captured background with a virtual background;

determining a change, during the video stream, to an exposure characteristic of the video capture device, wherein the exposure characteristic corresponds to an amount of light entering the video capture device;

in response to determining the change to the exposure characteristic, modifying the virtual background to match a virtual background brightness with a user image brightness to produce a modified virtual background, wherein modifying the virtual background further comprises:

determining one or more user image values including a dynamic range value, a sharpness value, a saturation value, and a noise value; and applying one or more adjustments to match the virtual background to the user image based on the one or more user image values; and modifying the frame by combining the user image with the modified virtual background.

2. The computer-implemented method of claim 1, further comprising:

in response to determining the change to the exposure characteristic, modifying the user image brightness in combination with the modifying of the virtual background to match the virtual background brightness and the user image brightness.

3. The computer-implemented method of claim 1, wherein modifying the virtual background further comprises:

determining a virtual background white point value and a user image white point value; and applying a color correction matrix to match the virtual background white point value and the user image white point value.

4. The computer-implemented method of claim 1, wherein modifying the virtual background further comprises:

determining a virtual background tilt angle and a video capture device tilt angle; and applying a rotation to the virtual background based on a difference between the video capture device tilt angle and the virtual background tilt angle.

5. The computer-implemented method of claim 4, further comprising:

determining a video capture device focal length and a virtual background focal length; and applying a zoom to the virtual background to match the video capture device focal length to the virtual background focal length.

6. The computer-implemented method of claim 1, wherein the virtual background comprises a dynamic virtual background.

7. The computer-implemented method of claim 1, wherein the virtual background is recommended to a user based on one or more of: a focal length of the video capture device, an appearance of the user, a time of day, and a location of the user.

8. A computer system comprising:
one or more computer processors;
one or more computer readable storage media;
program instructions stored on the one or more computer readable storage media for execution by at least one of the one or more computer processors, the program instructions comprising instructions to:

obtain, from a video capture device as part of a video stream, a frame comprising a user image and a captured background;

process the frame to replace the captured background with a virtual background;

determine a change, during the video stream, to an exposure characteristic of the video capture device, wherein the exposure characteristic corresponds to an amount of light entering the video capture device;

in response to determining the change to the exposure characteristic, modify the virtual background to match a virtual background brightness with a user image brightness to produce a modified virtual background, wherein modifying the virtual background further comprises:

determining one or more user image values including a dynamic range value, a sharpness value, a saturation value, and a noise value; and applying one or more adjustments to match the virtual background to the user image based on the one or more user image values; and modify the frame by combining the user image with the modified virtual background.

9. The computer system of claim 8, wherein the program instructions further comprise instructions to:

in response to determining the change to the exposure characteristic, modify the user image brightness in combination with the modifying of the virtual background to match the virtual background brightness and the user image brightness.

10. The computer system of claim 8, wherein the instructions to modify the virtual background further comprise instructions to:

determine a virtual background white point value and a user image white point value; and apply a color correction matrix to match the virtual background white point value and the user image white point value.

11. The computer system of claim 8, wherein the instructions to modify the virtual background further comprise instructions to:

determine a virtual background tilt angle and a video capture device tilt angle; and apply a rotation to the virtual background based on a difference between the video capture device tilt angle and the virtual background tilt angle.

12. The computer system of claim 11, further comprising instructions to:

determine a video capture device focal length and a virtual background focal length; and apply a zoom to the virtual background to match the video capture device focal length to the virtual background focal length.

13. The computer system of claim 8, wherein the virtual background comprises a dynamic virtual background.

14. The computer system of claim 8, wherein the virtual background is recommended to a user based on one or more of: a focal length of the video capture device, an appearance of the user, a time of day, and a location of the user.

15. A computer program product comprising one or more computer readable storage media collectively having program instructions embodied therewith, the program instructions executable by a computer to cause the computer to:

obtain, from a video capture device as part of a video stream, a frame comprising a user image and a captured background;

process the frame to replace the captured background with a virtual background;

determine a change, during the video stream, to an exposure characteristic of the video capture device, wherein the exposure characteristic corresponds to an amount of light entering the video capture device;

in response to determining the change to the exposure characteristic, modify the virtual background to match a virtual background brightness with a user image brightness to produce a modified virtual background, wherein modifying the virtual background further comprises:

determining one or more user image values including a dynamic range value, a sharpness value, a saturation value, and a noise value; and applying one or more adjustments to match the virtual background to the user image based on the one or more user image values; and modify the frame by combining the user image with the modified virtual background.

16. The computer program product of claim 15, wherein the program instructions further cause the computer to:

in response to determining the change to the exposure characteristic, modify the user image brightness in combination with the modifying of the virtual background to match the virtual background brightness and the user image brightness.

17. The computer program product of claim 15, wherein the instructions to modify the virtual background further cause the computer to:

determine a virtual background white point value and a user image white point value; and apply a color correction matrix to match the virtual background white point value and the user image white point value.

18. The computer program product of claim 15, wherein the instructions to modify the virtual background further cause the computer to:

determine a virtual background tilt angle and a video capture device tilt angle; and apply a rotation to the virtual background based on a difference between the video capture device tilt angle and the virtual background tilt angle.

19. The computer program product of claim 18, further comprising instructions to cause the computer to:

determine a video capture device focal length and a virtual background focal length; and apply a zoom to the virtual background to match the video capture device focal length to the virtual background focal length.

20. The computer program product of claim 15, wherein the virtual background comprises a dynamic virtual background.

* * * * *